United States Patent
Greenfield (10) Patent No.: US 10,212,268 B1
(45) Date of Patent: *Feb. 19, 2019

(54) PROXIMITY-ENHANCED RECONFIGURATION OF TELEPHONE RING LIST

(71) Applicant: CSC HOLDINGS, LLC, Bethpage, NY (US)

(72) Inventor: Jonathan Greenfield, Miller Place, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,668

(22) Filed: Sep. 27, 2017

Related U.S. Application Data (63) Continuation of application No. 12/901,379, filed on Oct. 8, 2010, now Pat. No. 9,807,226.

(51) Int. Cl.
| | |
|---|---|
| *H04M 3/00* | (2006.01) |
| *H04M 1/725* | (2006.01) |
| *H04W 4/02* | (2018.01) |
| *H04M 19/02* | (2006.01) |
| *H04M 3/42* | (2006.01) |

(Continued)

(52) U.S. Cl.
CPC ......... *H04M 1/72572* (2013.01); *H04M 3/42* (2013.01); *H04M 3/42365* (2013.01); *H04M 19/02* (2013.01); *H04W 4/023* (2013.01); *H04W 4/50* (2018.02); *H04M 1/57* (2013.01); *H04M 1/663* (2013.01); *H04M 3/42263* (2013.01); *H04M 2242/30* (2013.01); *H04M 2250/02* (2013.01); *H04M 2250/06* (2013.01); *H04M 2250/10* (2013.01); *H04W 4/021* (2013.01); *H04W 4/16* (2013.01)

(58) Field of Classification Search
CPC . H04W 52/0216; H04W 88/06; H04W 48/16; H04W 48/18; H04W 36/14; H04W 48/08; H04W 48/12; H04W 52/0229; H04W 52/24; H04W 52/243; H04W 60/00; H04W 68/00; H04W 72/005; H04W 8/005; H04W 64/00; H04W 4/02; H04W 84/12; H04W 4/021; H04W 74/00; H04W 4/008; H04W 24/00; H04L 67/18; H04L 67/12; H04L 1/1671; H04L 67/24; H04L 67/306; H04L 2209/80; H04L 67/22; H04L 67/303

See application file for complete search history.

(56) References Cited

U.S. PATENT DOCUMENTS

| | | |
|---|---|---|
| 8,312,540 B1 | 11/2012 | Kahn et al. |
| 9,729,930 B2 | 8/2017 | Greenfield |

(Continued)

*Primary Examiner* — Nimesh Patel
(74) *Attorney, Agent, or Firm* — Sterne, Kessler, Goldstein & Fox P.L.L.C.

(57) ABSTRACT

Proximity of a user/device to a designated location or other user/device can be determined and used to trigger automatic reconfiguration of a telephone ring list associated with the user/device. Accordingly, there is no need for manual reconfiguration to accommodate changes in the user's location or schedule. Specific phone numbers may be added or removed from a user's ring list based on proximity information, and the ring list may be reconfigured as the user and a second user enter or leave a common location. The user and the second user's desired phones will automatically ring for incoming calls based on the ring list and/or an identification of the incoming call.

20 Claims, 9 Drawing Sheets

(51) Int. Cl.
*H04W 4/50* (2018.01)
*H04W 4/16* (2009.01)
*H04W 4/021* (2018.01)
*H04M 1/663* (2006.01)
*H04M 1/57* (2006.01)

(56) References Cited

U.S. PATENT DOCUMENTS

| | | |
|---|---|---|
| 2005/0227714 A1 | 10/2005 | Bates et al. |
| 2006/0003802 A1 | 1/2006 | Sinai |
| 2007/0217411 A1 | 9/2007 | Danzeisen et al. |
| 2008/0174422 A1 | 7/2008 | Freathy et al. |
| 2009/0143056 A1 | 6/2009 | Tang et al. |
| 2009/0170479 A1 | 7/2009 | Jarenskog |
| 2010/0190474 A1 | 7/2010 | Rajguru |

PROXIMITY-ENHANCED RECONFIGURATION OF TELEPHONE RING LIST

CROSS REFERENCE TO RELATED APPLICATIONS

This application claims benefit as a continuation to pending U.S. patent application Ser. No. 12/901,379, filed Oct. 8, 2010, also entitled "PROXIMITY-ENHANCED RECONFIGURATION OF TELEPHONE RING LIST," and which is hereby incorporated by reference as if fully set forth herein.

BACKGROUND

Field of the Invention

Embodiments relate generally to reconfiguration of a telephone ring list, and more particularly to reconfiguring based on proximity information.

Background Art

A "Follow Me" or "Find Me" system can cause multiple target phones to ring for incoming calls to a phone number for a user. However, the system is associated with a manual configuration that the user is required to access to set up and make configuration changes.

Such systems can include customizations. Different groups of callers can cause different lists of target phones to ring, and schedules associated with each target phone can cause a given phone to be removed from a target list at specific times according to the schedule.

However, these systems are limited to fixed schedules. If a user deviates from the schedule (e.g., taking a vacation or a sick day, staying late at work, delayed by traffic), the system can cause the wrong phones to ring until the user manually reconfigures the system.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

In an embodiment, the proximity of a user/device to a designated location or other user/device can be determined. The proximity can be used to trigger automatic reconfiguration of a telephone ring list associated with the user/device, without the need for manual reconfiguration when the user changes locations or as the user's schedule varies from day to day. In an embodiment, specific phone numbers may be added to or removed from a user's ring list based on proximity information. The ring list may be reconfigured as the user arrives at or departs from a designated location. Accordingly, the user's desired phones will automatically ring for incoming calls when the user is present at an associated location. Additional variations include determining a proximity to another user/device, configuring the ring list to have a "Do not disturb" configuration, selecting a ring list from a plurality of ring lists, and configuring/selecting the ring list based on an identification of the incoming call.

The specific illustrations and embodiments are described with respect to various platforms including personal computers, cellular telephones, personal digital assistants (PDAs), tablets (e.g., Apple® iPad™), and other mobile devices, Internet Protocol (IP)-based telephones using voice over IP (VOIP), and other systems capable of receiving telephone calls and/or utilizing a network connection such as the Internet. References to a telephone or telephone number should therefore be interpreted to include these and other similar systems capable of involving telephone calls.

Although specific embodiments of determining locations and/or proximity are described, embodiments can be implemented, for example, as disclosed in U.S. patent application Ser. No. 12/652,463, filed Jan. 5, 2010 and entitled "Enhanced Subscriber Authentication Using Location Tracking," the contents of which are hereby incorporated by reference in full.

Figure 1:
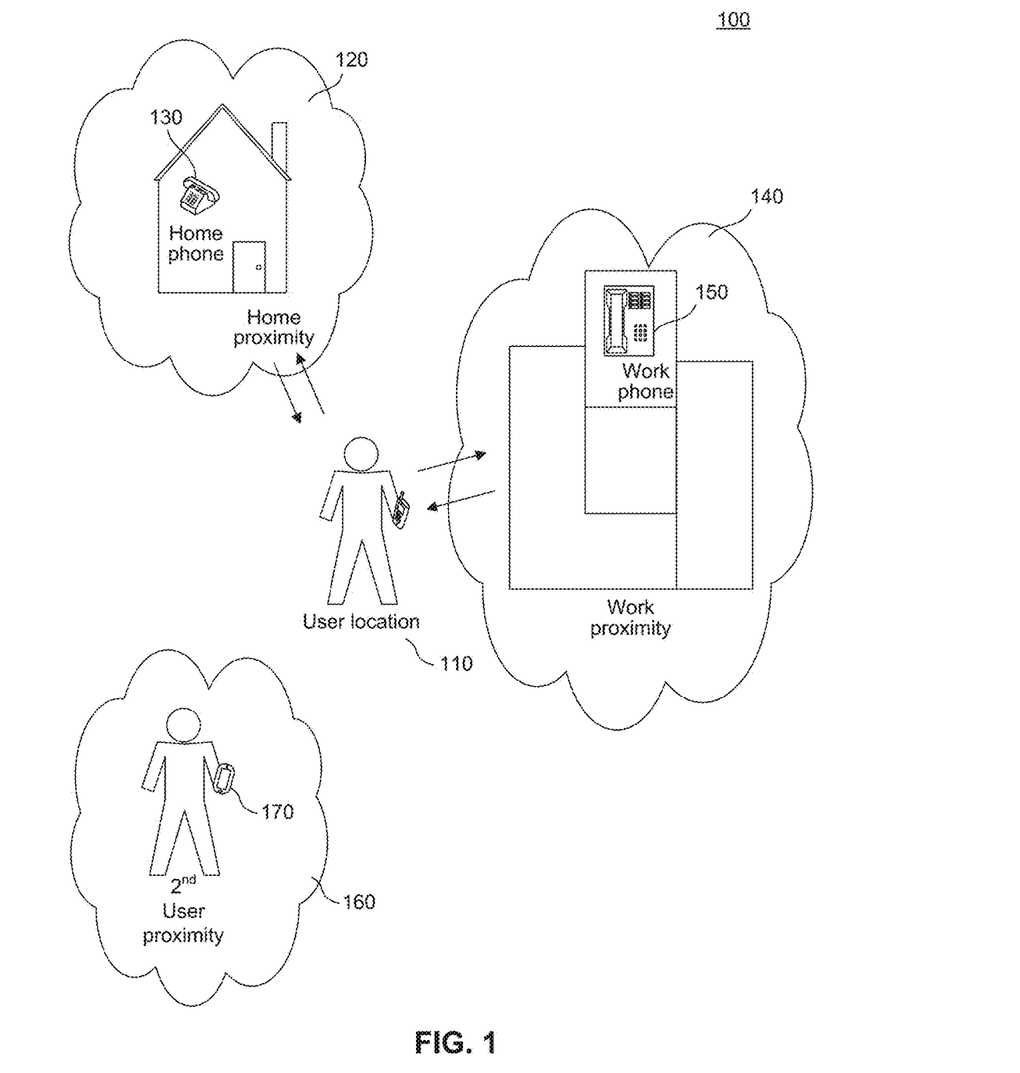
FIG. 1 is a diagram of a telephone ring list reconfiguration system including proximity recognition according to an embodiment.

FIG. 1 is a diagram of a telephone ring list reconfiguration system 100 including proximity recognition according to an embodiment. The system 100 determines a user location 110 associated with a user. Additionally, the system 100 determines the user's proximity to other designated locations, including home proximity 120 and work proximity 140. The system 100 may also determine the user's location relative to a second user proximity 160. For example, the system 100 can determine a second user proximity 160 based on a device 170 associated with the second user.

System 100 reconfigures a ring list associated with incoming calls for the user. In embodiments, configuring and/or reconfiguring may include creating, modifying, and/or selecting a ring list. Accordingly, the system can automatically cause one or more phones to ring in response to the incoming call and the ring list. In the illustrated embodiment of FIG. 1, when the user location 110 is not associated with a specific location or other user/device, system 100 causes the user's mobile device to ring in response to incoming calls. When the user location 110 is associated with home proximity 120, system 100 causes home phone 130 to ring in response to an incoming call to the user. System 100 may also cause the user's mobile device to ring simultaneously or following a period of time after home phone 130 rings. Similarly, system 100 can cause work phone 150 to ring when the user location 110 is associated with work proximity 140.

System 100 can also select a different ring list (or create a new ring list, or modify an existing ring list) when the user location 110 is associated with a second user proximity 160. As illustrated, the second user proximity 160 can be determined based on the second user's mobile device 170. In an embodiment, system 100 can cause the user's incoming calls automatically to go directly to voicemail when the user location 110 is associated with the $2^{nd}$ user proximity 160.

Figure 2:
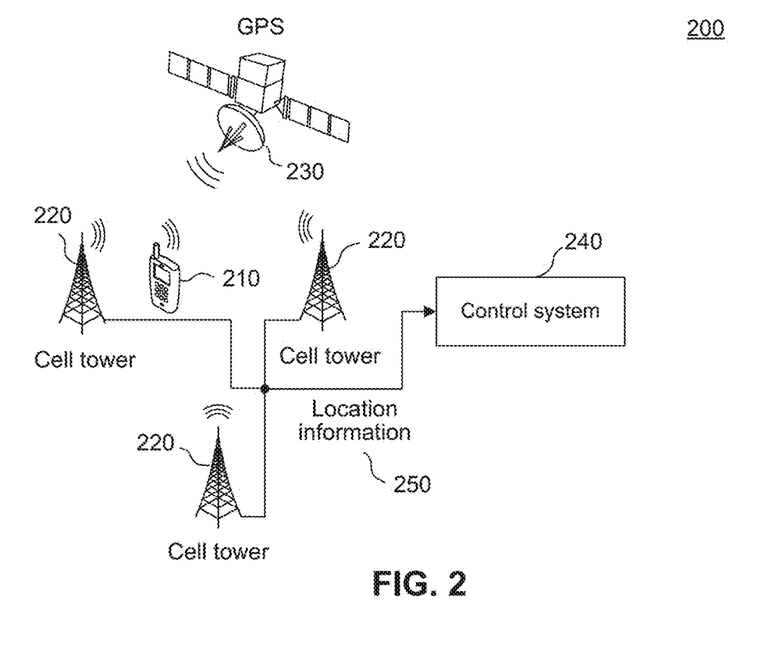
FIG. 2 is a diagram of an architecture of a telephone ring list reconfiguration system including proximity recognition according to an embodiment.

FIG. 2 is a diagram of an architecture of a telephone ring list reconfiguration system 200 including proximity recognition according to an embodiment. A location of mobile device 210 may be determined based on triangulation and/or signal detection of cell towers 220. Location of mobile device 210 may also be determined based on Global Positioning System (GPS) tracking or assisted-GPS (A-GPS) tracking based on GPS system 230.

Control system 240 receives location information 250. Location information 250 can be received from a cell tower infrastructure, as illustrated. Alternatively, the mobile device 210 can obtain the location information 250 and transmit the location information 250 to the control system 240. The control system 240 processes the location information 250 and configures the ring list accordingly.

Figure 3:
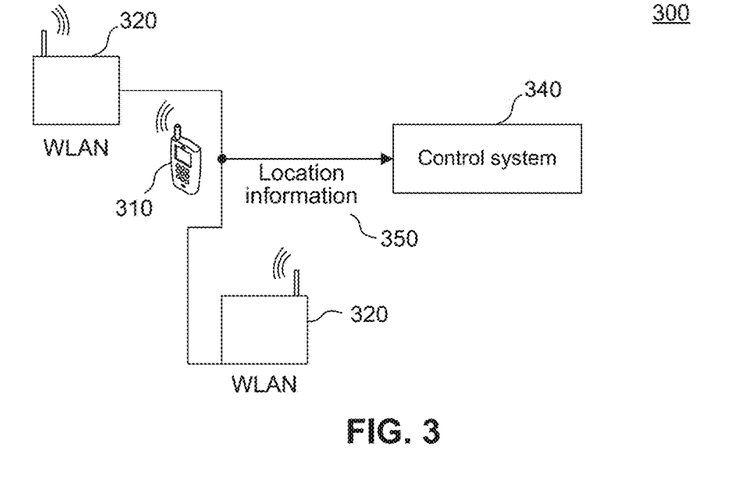
FIG. 3 is a diagram of an architecture of a telephone ring list reconfiguration system including proximity recognition according to an embodiment.

FIG. 3 is a diagram of an architecture of a telephone ring list reconfiguration system 300 including proximity recognition according to an embodiment. A location of mobile device 310 may be determined based on triangulation and/or signal detection of wireless local area network (WLAN) devices 320. Location of mobile device 310 may also be determined based on access point association with the network associated with WLAN devices 320, and/or by a lookup of location information (e.g., from a database) for IP address ranges associated with WLAN devices 320.

Control system 340 receives location information 350. As illustrated, location information 350 can be received from a WLAN infrastructure. Alternatively, the mobile device 310 can obtain the location information 350 and transmit the location information 350 to the control system 340. The control system 340 then processes the location information 350 and configures the ring list accordingly.

Figure 4:
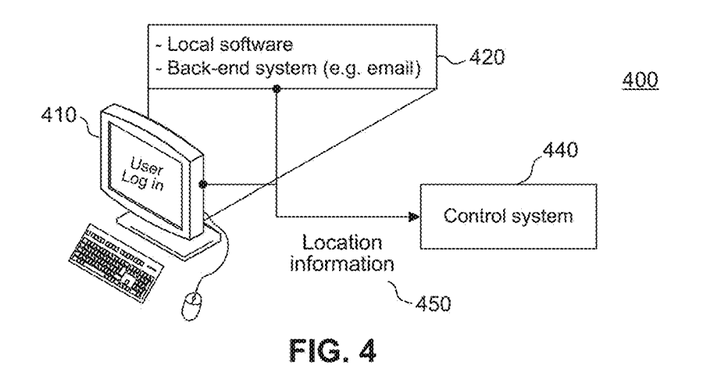
FIG. 4 is a diagram of an architecture of a telephone ring list reconfiguration system including proximity recognition according to an embodiment.

FIG. 4 is a diagram of an architecture of a telephone ring list reconfiguration system 400 including proximity recognition according to an embodiment. Location information 450 can be determined based on a user log in 410, for example a user accessing a personal computer associated with a designated location. Location information 450 also can be determined based on access to services 420. Control system 440 processes the location information 450 and configures the ring list accordingly.

The location information 450 can be determined by tracking user activities. For example, when the user logs in to a particular account, the location information 450 can be determined based on a variety of techniques including those described in U.S. patent application Ser. No. 12/652,463, filed Jan. 5, 2010 and entitled "Enhanced Subscriber Authentication Using Location Tracking." Additionally, a user may configure local software on a computer to notify control system 440 when the user performs a user login 410 on that computer, and back-end system software (e.g., email) can be configured to enable location information 450 to be obtained.

Figure 5:
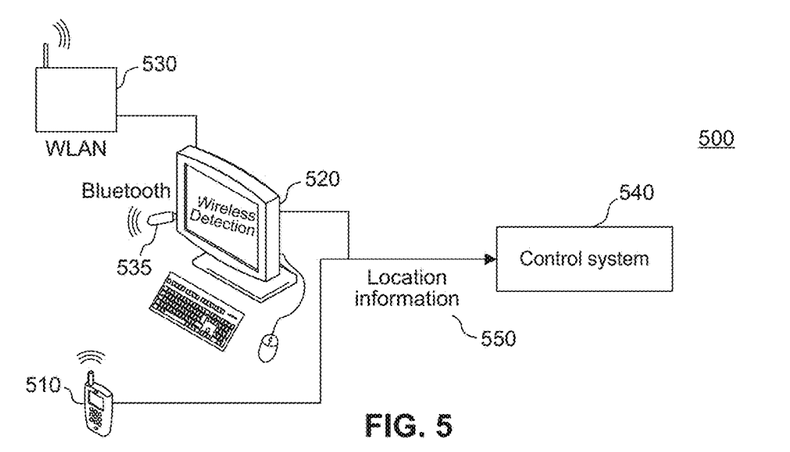
FIG. 5 is a diagram of an architecture of a telephone ring list reconfiguration system including proximity recognition according to another embodiment.

FIG. 5 is a diagram of an architecture of a telephone ring list reconfiguration system 500 including proximity recognition according to another embodiment. A location of mobile device 510 may be determined based on triangulation and/or signal detection of wireless local area network (WLAN) device 530 and/or Bluetooth device 535. Location of mobile device 510 may also be determined based on association with WLAN device 530 and/or Bluetooth device 535.

Control system 540 receives location information 550. As illustrated, location information 550 can be received from a WLAN infrastructure associated with WLAN device 530. Location information 550 can also be obtained from computer 520, which can communicate with WLAN device 530 and Bluetooth device 535. Additionally, the mobile device 510 can obtain the location information 550 based on detection of and/or triangulation of signals associated with WLAN device 530 and/or Bluetooth device 535. The mobile device 510 may transmit the location information 550 to the control system 540. The control system 540 processes the location information 550 and configures the ring list accordingly.

In the embodiments described above, the designated location of a device, e.g., a computer or networked device, can be determined, for example, by a user registering an Internet Protocol (IP) address as a designated location, such as "home." Accordingly, when the user is associated with the registered IP address, the control system can determine that the user is in the associated proximity. For example, a user's mobile device can include Wi-Fi capability, and connect to a WLAN device or gateway broadcasting a Wi-Fi signal, when the mobile device is within range. Upon connecting, the mobile device can be assigned an IP address, and the IP address of the device broadcasting the Wi-Fi signal also can be obtained. Such IP addresses can be compared to registered addresses, and can also be looked up in geolocation databases/lookup services for IP addresses. Similar location techniques can be applied for other personal area network technologies, such as Bluetooth. Gateways can include Wi-Fi access points, femtocells, and other nodes for establishing connections. A gateway may be recognized directly by a device, for example by recognizing a Media Access Control (MAC) address, Ethernet Hardware Address (EHA), or other hardware address, adapter address, or physical address associated with the gateway and/or registered as a designated location (e.g., "home").

A gateway can be configured to register a dynamic Domain Name System (DNS) domain name. The domain name can be defined as the designated location so that the system can automatically update if the gateway IP address is dynamically changed over time. The gateway can automatically report its IP address to the control system and/or the mobile device, enabling the system to automatically update as the gateway's IP address changes.

Figure 6:
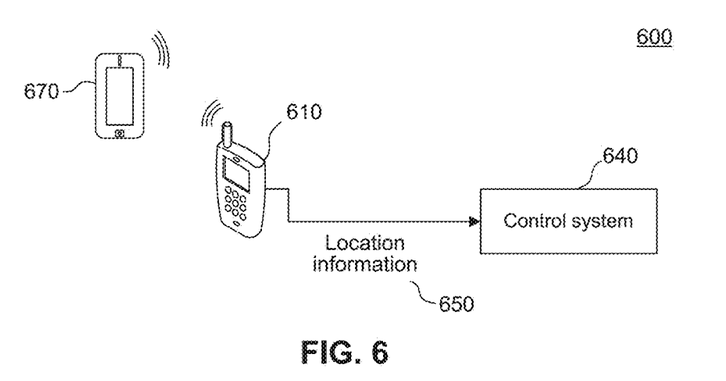
FIG. 6 is a diagram of an architecture of a telephone ring list reconfiguration system including proximity recognition according to an embodiment.

FIG. 6 is a diagram of an architecture of a telephone ring list reconfiguration system 600 including proximity recognition according to an embodiment. A relative location of mobile device 610 may be determined based on signal detection of and/or association with a mobile device 670, for example a second user's mobile device. In an embodiment, mobile devices 610 and 670 can include Bluetooth and/or Wi-Fi transceivers. Mobile device 610 can detect Bluetooth and/or Wi-Fi signals from mobile device 670, and determine a proximity to mobile device 670. Mobile device 610 can then report location information 650, which can include location information for mobile device 610 and/or mobile device 670.

Control system 640 receives location information 650. As illustrated, the mobile device 610 can obtain the location information 650 and transmit the location information 650 to the control system 640. Mobile device 670 can also detect a proximity to mobile device 610, and report location information for mobile device 610 and/or mobile device 670 to control system 640. The control system 640 processes the location information 650 and configures the ring list accordingly.

Proximity to a second user can be determined based on any of the various embodiments described herein. For example, location of a first user can be determined based on association with a WLAN device 320 as illustrated in FIG. 3, and location of a second user can be determined based on a user login 410 as illustrated in FIG. 4. The control system can determine that the first and second users are proximate to each other based on the first and second location information, even though the location information is obtained from different sources using different techniques. A control system can recognize the location of a device, and/or the device can recognize its own location and report such back to the control system. One or more configuration rules can be executed by the control system based on a determination that a device has arrived at or departed from a configured location, to modify the device user's ring list. A ring list can include indications to sequentially or simultaneously ring the listed phone numbers. Systems can include a default behavior and/or ring list. Locations can be absolute or relative, or associated with a connection. Calls can be routed directly, or calls can be routed indirectly by conferencing or other telecommunication techniques.

Figure 7:
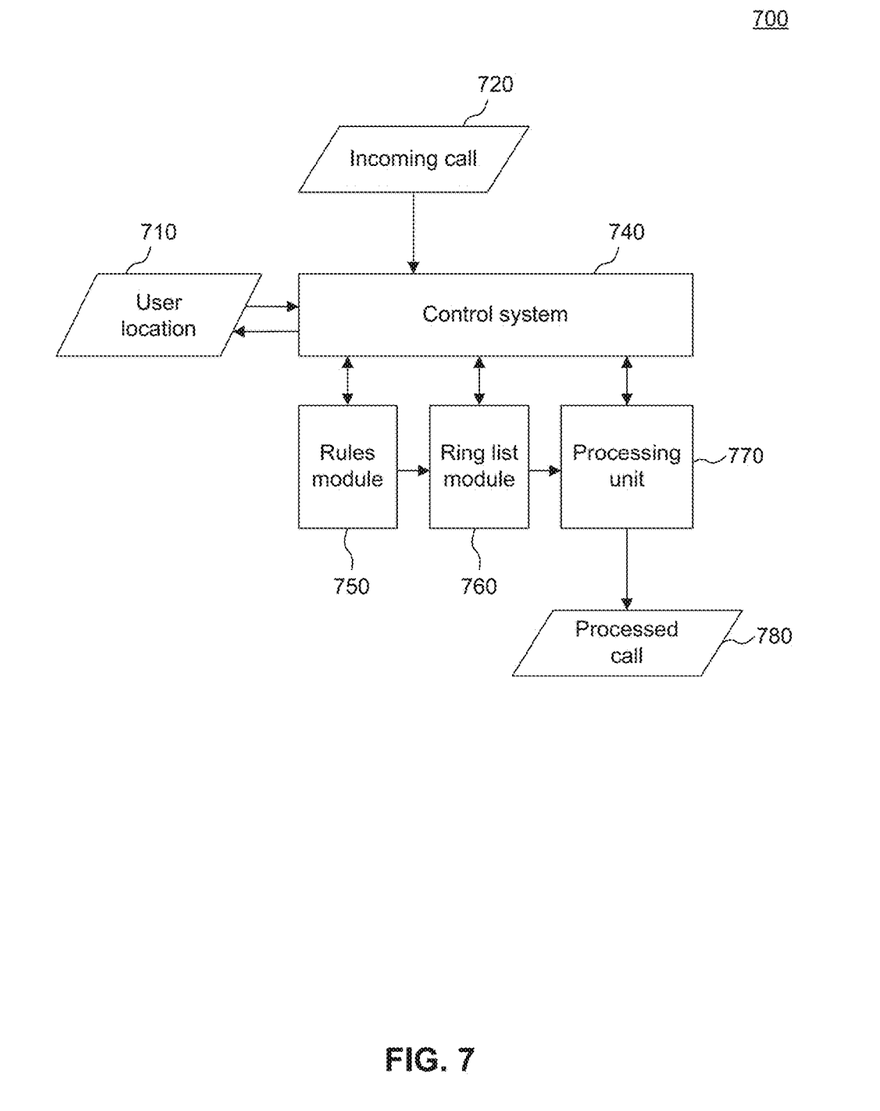
FIG. 7 is a block diagram of an architecture of a telephone ring list reconfiguration system on which embodiments can be implemented.

FIG. 7 is a block diagram of an architecture of a telephone ring list reconfiguration system 700 on which embodiments can be implemented. The system 700 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

User location 710 is determined, and communicated to control system 740. Incoming call 720 is also received and/or processed by control system 740. Control system 740 interacts with rules module 750, ring list module 760, and processing unit 770. Rules module 750, ring list module 760, and processing unit 770 can communicate with each other and control system 740. Processing unit 770 processes the incoming call 720 and produces a processed call 780. Although specific modules are illustrated, one or more modules may be omitted or combined with other modules to provide the described features.

Figure 8:
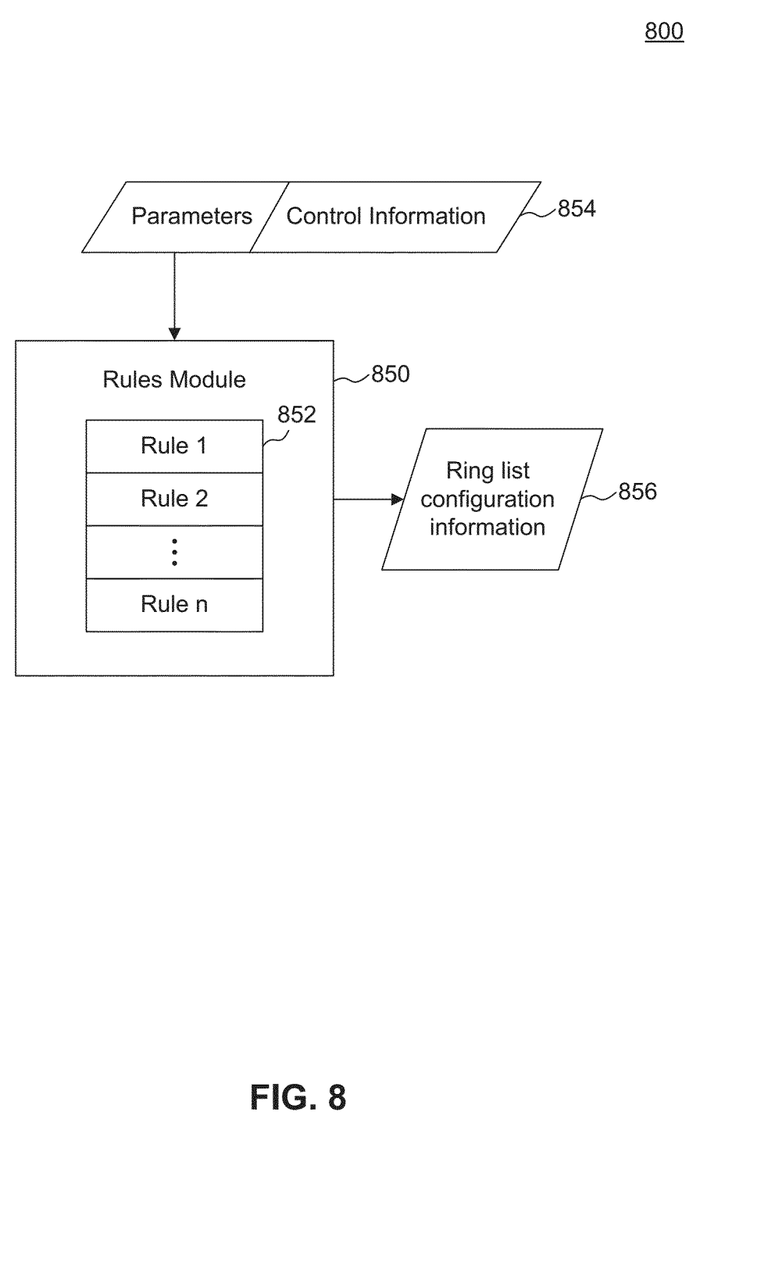
FIG. 8 is a block diagram of an architecture of a telephone ring list reconfiguration system on which embodiments can be implemented.

FIG. 8 is a block diagram of an architecture 800 of a telephone ring list reconfiguration system on which embodiments can be implemented. Rules module 850 may correspond to rules module 750 illustrated in FIG. 7. Rules module 850 receives parameters and control information 854. For example, rules module 850 receives control information 854 relating to the incoming call 720, user location, time of day, user device, and so on. Rules module 850 includes rules 852 that can be executed based on the parameters and control information 854. Results from processing by the rules 852 are obtained in the form of ring list configuration information 856.

Rules 852 can include actions based on designated locations, devices, users, times, schedules, types of connections, the incoming call, and so on. For example, a rule 852 may specify the inclusion of a home telephone number on a ring list only when a user's mobile device is in the home proximity. A rule 852 may specify the inclusion of an office telephone number on the ring list only when the user's mobile device is at the work proximity. A rule 852 may designate a range of distances to be considered within a proximity. Similarly, a rule 852 may include a frequency of updating and/or checking the parameters and/or control information 854 associated with determining user locations. Yet another rule 852 may include a group of incoming (originating) phone numbers, such that calls whose incoming telephone number is in the group causes the system to use a voicemail ring list to send the incoming call directly to voicemail without ringing any of the user's phones. Other rules can be configured to act based on the incoming phone number.

Figure 9A:
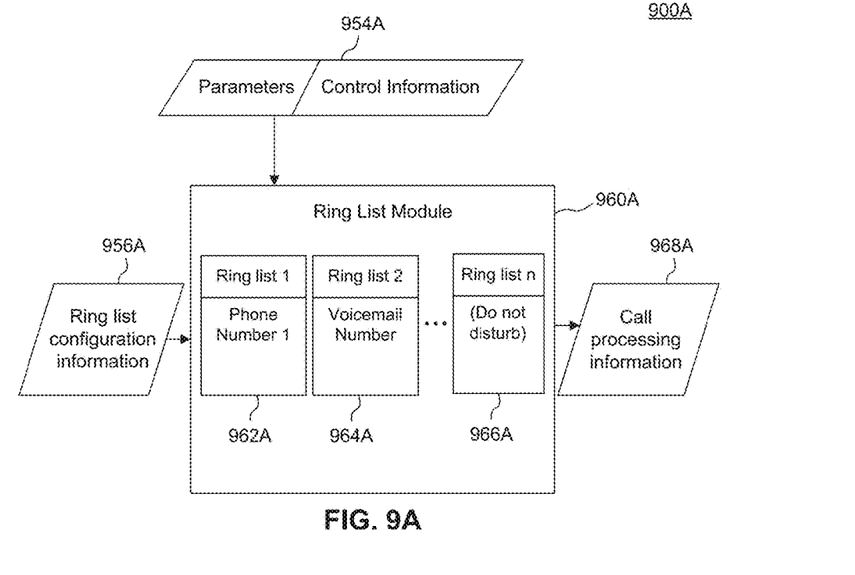
FIG. 9A is a block diagram of an architecture of a telephone ring list reconfiguration system on which embodiments can be implemented.

FIG. 9A is a block diagram of an architecture 900A of a telephone ring list reconfiguration system on which embodiments can be implemented. Ring list module 960A may correspond to Ring list module 760 illustrated in FIG. 7. Ring list module 960A receives parameters/control information 954A and ring list configuration information 956A. Ring lists 1 . . . n (reference numerals 962A . . . 966A) are available for selection by ring list module 960A. Based on the parameters/control information 954A and ring list configuration information 956A, the ring list module 960A selects a ring list and produces call processing information 968A. For example, when a user is in a home proximity, a corresponding ring list may be selected.

Ring list 1 (962A) includes Phone number 1. When ring list module 960A selects ring list 1 (962A), the call processing information 968A indicates that the incoming call should be sent to phone number 1, causing its associated telephone to ring. Similar actions regarding voicemail (ring list 2), "Do Not Disturb" (ring list n), and others are possible using various selectable ring lists based on rules, configuration information, parameters, and other features of the configuration system.

Additionally, ring lists 1 . . . n can include incoming lists/groups of telephone numbers associated with incoming calls, such as a designated group of caller telephone numbers (an incoming list). The ring list module 960A can determine if the incoming call's telephone number is associated with an incoming list, and configure/select a ring list corresponding to the incoming list/group. For example, an incoming list can include telephone numbers associated with a user's family members. That incoming list is associated with a ring list that the user designates as "family." When an incoming call from a family member is received, the control system rings phones according to the user's "family" ring list (e.g., rings the user's mobile phone and home phone if in proximity). Incoming calls may be checked against incoming lists, and corresponding ring lists may be selected based on the incoming list and the user's proximity/location and other information.

Figure 9B:
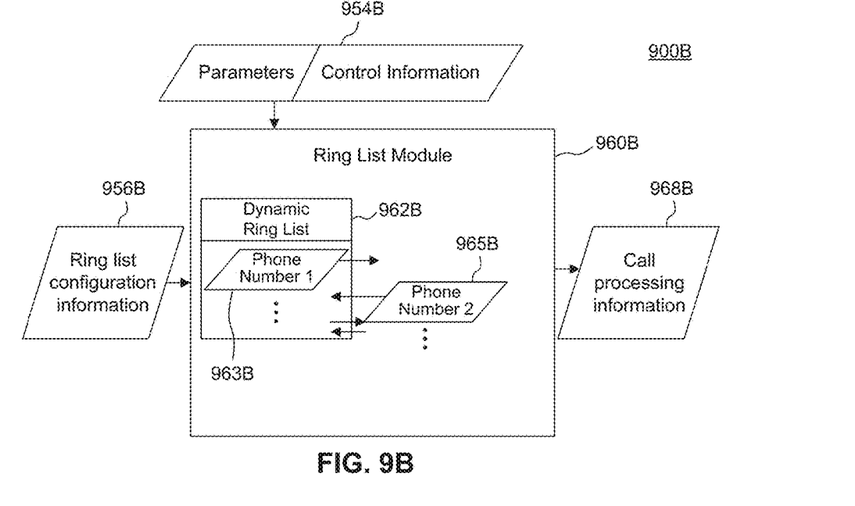
FIG. 9B is a block diagram of an architecture of a telephone ring list reconfiguration system on which embodiments can be implemented.

FIG. 9B is a block diagram of an architecture 900B of a telephone ring list reconfiguration system on which embodiments can be implemented. Ring list module 960B may correspond to Ring list module 760 illustrated in FIG. 7. Ring list module 960B receives parameters/control information 954B and ring list configuration information 956B. Dynamic ring list 962B is managed by the ring list module 960B. Dynamic ring list 962B is available for configuration by adding or removing phone numbers. Dynamic ring list 962B may also be newly created. As illustrated, phone number 1 (963B) is being removed from dynamic ring list 962B, and phone number 2 (965B) is being added to dynamic ring list 962B. Based on the parameters/control information 954B and ring list configuration information 956B, the ring list module 960B manages the dynamic ring list 962B and produces call processing information 968B. For example, when a user arrives at a home proximity, telephone numbers associated with the user's home telephones may be added to the dynamic ring list 962B, and telephone numbers no longer applicable to the user's proximity may be removed.

Figure 10:
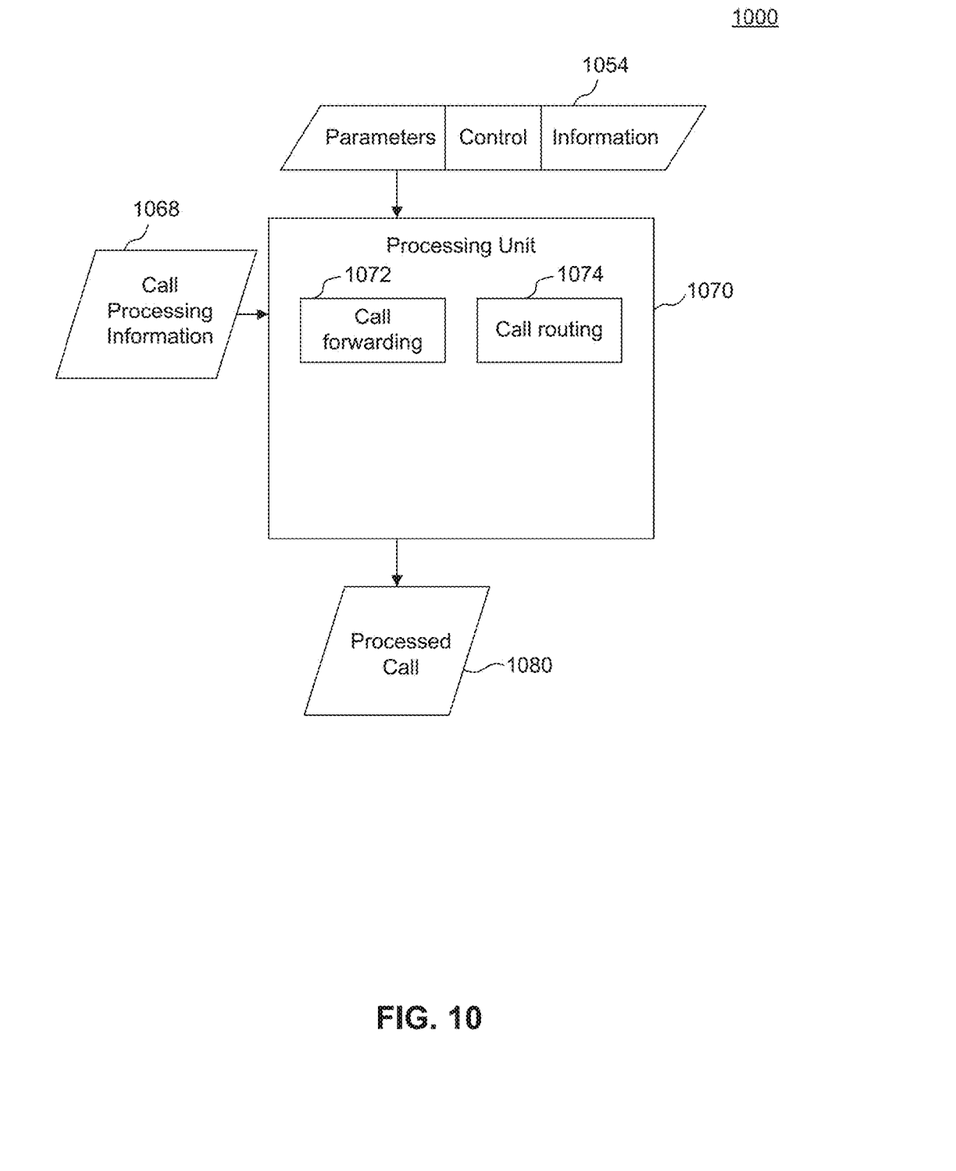
FIG. 10 is a block diagram of an architecture of a telephone ring list reconfiguration system on which embodiments can be implemented.

FIG. 10 is a block diagram of an architecture 1000 of a telephone ring list reconfiguration system on which embodiments can be implemented. Processing unit 1070 may correspond to processing unit 770 illustrated in FIG. 7. Processing unit 1070 receives parameters/control information 1054 and call processing information 1068. Processing unit 1070 operates on the parameters/control information 1054 and call processing information 1068 using call forwarding block 1072 and call routing block 1074. Processing unit 1070 processes the incoming call and produces a processed call 1080. For example, processed call 1080 may be routed based on call routing block 1074 to a target phone number according to the ring list. Accordingly, an incoming call to a user will be routed to a target phone (or other destination) according to the user's ring list. Although not specifically illustrated, other processing blocks or telecommunication techniques can be used in processing unit 1070, for example a call disconnecting block, a call terminating block, or the like for processing telephone calls, including Internet Protocol (IP) call processing.

Figure 11:
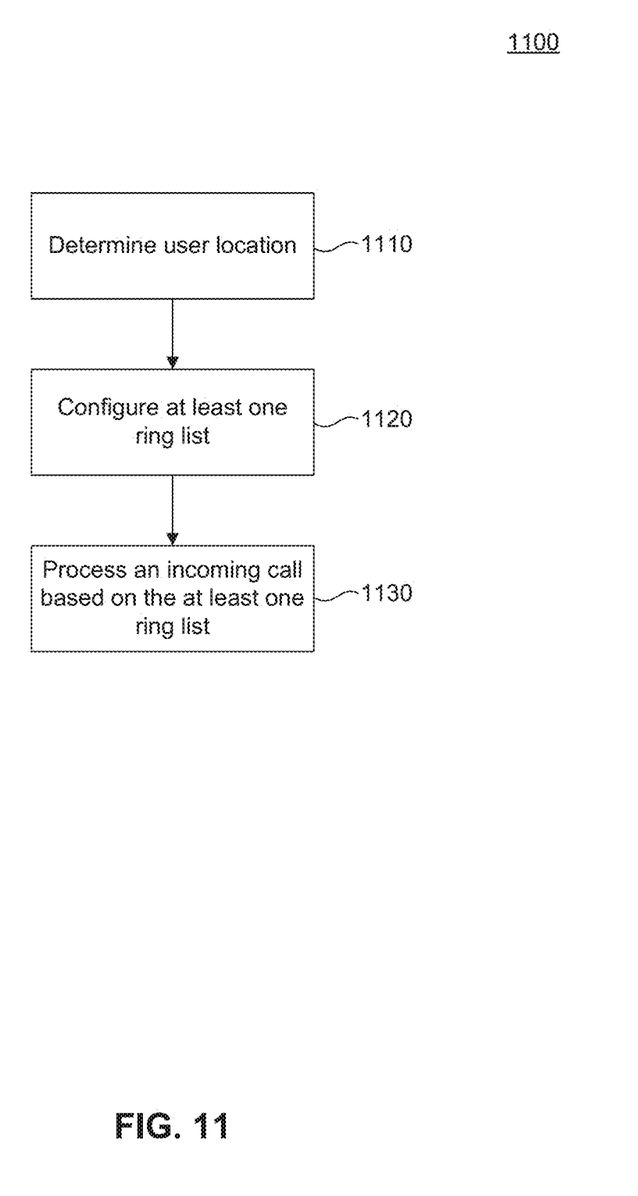
FIG. 11 is an example flowchart of a telephone ring list reconfiguration method according to an embodiment.

FIG. 11 is an example flowchart of a telephone ring list reconfiguration method according to an embodiment. In step 1110, the system determines a user location. In step 1120, the system configures at least one ring list based on the determined user location. In step 1130, the system processes an incoming call based on the at least one configured ring list.

The following is an example scenario using some embodiments described herein. User Joe defines locations for office and home. He configures his cell phone as a control device. He additionally configures rules to include his home telephone number on his ring list only when his cell phone is at the location (or in the vicinity) of his home. He configures a second rule to include his office telephone number on his ring list only when his cell phone is at the location (or in the vicinity) of his office. As user Joe nears his home, with his cell phone, the control system recognizes (via cell phone location techniques) that Joe is at or near his home. The control system automatically adds his home phone number to his ring list. When user Joe leaves the home proximity, the control system recognizes this and automatically removes user Joe's home phone number from his ring list. Accordingly, user Joe's ring list is automatically updated without any intervention or manual configuration from user Joe.

Figure 12:
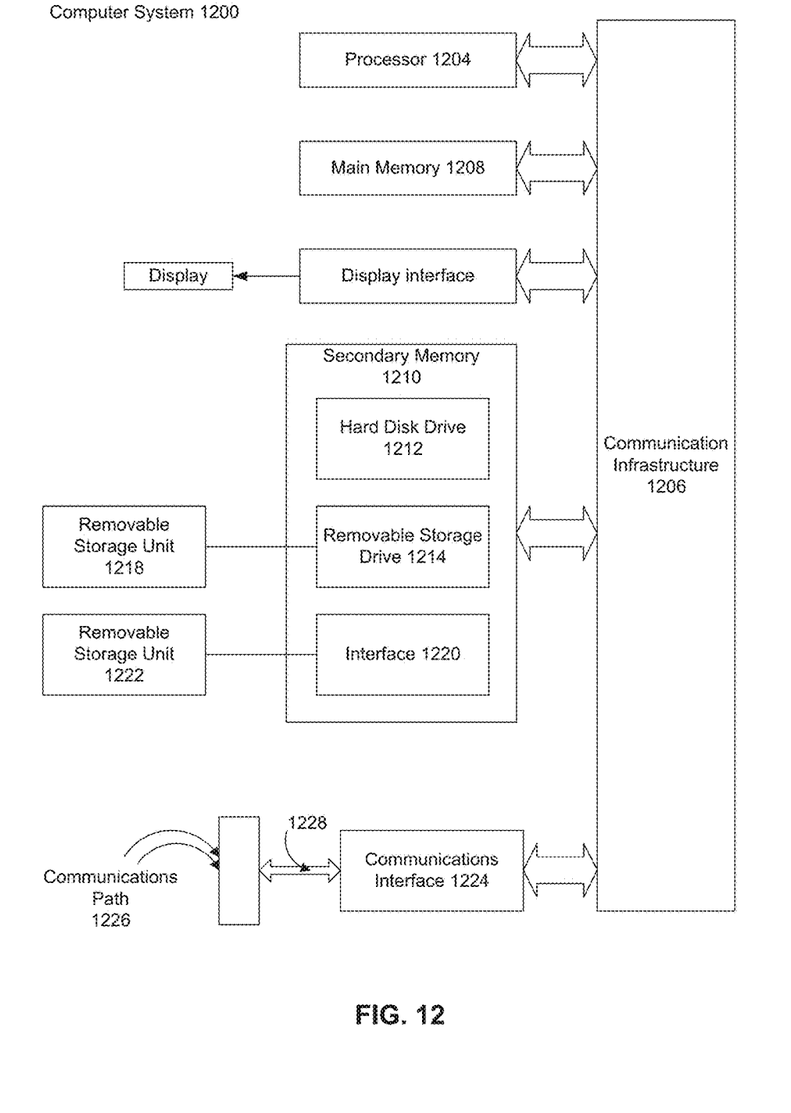
FIG. 12 is a schematic diagram of an example computer system used to implement embodiments of the telephone ring list reconfiguration system.

FIG. 12 is a schematic diagram of an example computer system 1200 used to implement embodiments of the telephone ring list reconfiguration system, and/or other systems. Various aspects of the various embodiments can be implemented by software, firmware, hardware, or a combination thereof. FIG. 12 illustrates an example computer system 1200 in which an embodiment, or portions thereof, can be implemented as computer-readable code. Various embodiments are described in terms of this example computer system 1200. After reading this description, it will become apparent to a person skilled in the relevant art how to implement embodiments using other computer systems and/or computer architectures.

Computer system 1200 includes one or more processors, such as processor 1204. Processor 1204 can be a special purpose or a general purpose processor. Processor 1204 is connected to a communication infrastructure 1206 (for example, a bus or network).

Computer system 1200 also includes a main memory 1208, preferably random access memory (RAM), and may also include a secondary memory 1210. Secondary memory 1210 may include, for example, a hard disk drive 1212 and/or a removable storage drive 1214. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. which is read by and written to by removable storage drive 1214. As will be appreciated by persons skilled in the relevant art(s), removable storage unit 1218 includes a tangible computer readable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (e.g., an Ethernet card), a communications port, a PCMCIA slot and card, or the like. Software and data transferred via communications interface 1224 are provided to communications interface 1224 via a communications path 1226. Communications path 1226 may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Computer program medium and computer usable medium can also refer to memories, such as main memory 1208 and secondary memory 1210, which can be memory semiconductors (e.g. DRAMs, etc.). These computer program products are means for providing software to computer system 1200.

Computer programs (also called computer control logic) are stored in main memory 1208 and/or secondary memory 1210. Computer programs may also be received via communications interface 1224. Such computer programs, when executed, enable computer system 1200 to implement embodiments as discussed herein, such as the system described above. In particular, the computer programs, when executed, enable processor 1204 to implement the processes of embodiments. Accordingly, such computer programs represent controllers of the computer system 1200. Where embodiments are implemented using software, the software may be stored in a computer program product and loaded into computer system 1200 using removable storage drive 1214, interface 1220, hard drive 1212 or communications interface 1224.

Described above are systems, apparatuses, and methods for proximity-enhanced reconfiguration of telephone ring lists, and applications thereof. It is to be appreciated that the Detailed Description section, and not the Abstract, is intended to be used to interpret the claims. The Abstract may set forth one or more but not all exemplary embodiments of the present invention as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of receiving a telephone call, comprising:
   determining a first location of a first user based on proximity of a first telephone to a first wireless local area network (WLAN) or based on the first user accessing a first device associated with the first location, wherein the first user is associated with the first telephone having a first telephone number;
   determining a second location of a second user based on proximity of a second telephone to the first WLAN or a second WLAN or based on the second user accessing a second device associated with the second location, wherein the second user is associated with the second telephone having a second telephone number;
   configuring a telephone ring list based on co-location of the first user and the second user, wherein the ring list comprises the first telephone number and the second telephone number; and
   processing the telephone call according to the telephone ring list.

2. The method of claim 1, wherein configuring the telephone ring list comprises assigning a do-not-disturb setting based on co-location of the first user and the second user.

3. The method of claim 1, wherein processing the telephone call according to the telephone ring list comprises routing the telephone call to voicemail of the first user based on co-location of the first user and the second user.

4. The method of claim 1, wherein processing the telephone call comprises routing the telephone call to both the first telephone number and the second telephone number such that the first user and the second user can join a conference call with a calling party.

5. The method of claim 1, further comprising reconfiguring the telephone ring list when the first user and the second user are no longer in co-location.

6. The method of claim 1, wherein processing the telephone call according to the telephone ring list comprises:
   routing the telephone call to the first telephone number; and
   sequentially routing the telephone call to the second telephone number if the first user does not answer the first telephone.

7. The method of claim 1, further comprising routing the telephone call to both the first telephone number and the second telephone number such that the first telephone and the second telephone simultaneously ring.

8. The method of claim 1, wherein the first telephone and the second telephone are any mobile devices capable of receiving telephone calls and utilizing a network connection.

9. The method of claim 1, wherein determining the first location of the first user comprises searching a database for a first IP address or a first range of IP addresses associated with a first WLAN device and wherein determining the second location of the second user comprises searching the database for a second IP address or a second range of IP addresses associated with the first WLAN device or a second WLAN device.

10. The method of claim 1, wherein determining the first location of the first user comprises detecting a first signal of a first WLAN device and wherein determining the second location of the second user comprises detecting a second signal of the first WLAN device or a second WLAN device.

11. A system for receiving a telephone call, comprising:
    a control system configured to:

determine a first location of a first user based on proximity of a first telephone to a first wireless local area network (WLAN) or based on the first user accessing a first device associated with the first location, wherein the first user is associated with the first telephone having a first telephone number; and determine a second location of a second user based on proximity of a second telephone to the first WLAN or a second WLAN or based on the second user accessing a second device associated with the second location, wherein the second user is associated with the second telephone having a second telephone number;

a ring list module, interfacing with the control system, to configure a telephone ring list based on co-location of the first user and the second user, wherein the ring list comprises the first telephone number and the second telephone number; and a processing unit, interfacing with the control system, configured to process the telephone call according to the telephone ring list.

12. The system of claim 11, wherein the ring list module is configured to assign a do-not-disturb setting based on co-location of the first user and the second user.

13. The system of claim 11, wherein the processing unit is further configured to route the telephone call to voicemail of the first user based on co-location of the first user and the second user.

14. The system of claim 11, wherein the processing unit is further configured to route the telephone call to both the first telephone number and the second telephone number such that the first user and the second user can join a conference call with a calling party.

15. The system of claim 11, wherein the ring list module is configured to reconfigure the telephone ring list when the first user and the second user are no longer in co-location.

16. The system of claim 11, wherein the processing unit is further configured to:
    route the telephone call to the first telephone number; and
    sequentially route the telephone call to the second telephone number if the first user does not answer the first telephone.

17. The system of claim 11, wherein the processing unit is further configured to route the telephone call to both the first telephone number and the second telephone number such that the first telephone and the second telephone simultaneously ring.

18. The system of claim 11, wherein the first telephone and the second telephone are any mobile devices capable of receiving telephone calls and utilizing a network connection.

19. The system of claim 11, wherein the control system is further configured to search a database for a first IP address or a first range of IP addresses associated with a first WLAN device to determine the first location of the first user and search the database for a second IP address or a second range of IP addresses associated with the first WLAN device or a second WLAN device to determine the second location of the second user.

20. The system of claim 11, wherein the control system is further configured to detect a first signal of a first WLAN device to determine the first location of the first user and detect a second signal of the first WLAN device or a second WLAN device to determine the second location of the second user.

* * * * *